United States Patent [19]

Starzewski

[11] Patent Number: 5,650,227
[45] Date of Patent: Jul. 22, 1997

[54] POLYACETYLENE-CONTAINING MOULDINGS

[75] Inventor: Karl-Heinz Aleksander Ostoja Starzewski, Bad Vilbel, Germany

[73] Assignee: AGFA-Gevaert Aktiengesellschaft, Leverkusen, Germany

[21] Appl. No.: 516,676

[22] Filed: Aug. 18, 1995

[30] Foreign Application Priority Data

Aug. 25, 1994 [DE] Germany .................. 44 30 097.2

[51] Int. Cl.⁶ .............. B32B 27/28; C08J 7/06; C08L 49/00; C09D 1/02
[52] U.S. Cl. ............ 428/341; 428/427; 428/428; 428/429; 428/441; 428/446; 428/447; 428/448; 428/453
[58] Field of Search ................... 428/341, 427, 428/428, 429, 446, 447, 448, 453, 441

[56] References Cited

U.S. PATENT DOCUMENTS 5,049,427  9/1991  Starzeski et al. .............. 428/40.4

FOREIGN PATENT DOCUMENTS 0311432  4/1989  European Pat. Off. .
0374626  6/1990  European Pat. Off. .

OTHER PUBLICATIONS

Database WPI, AN 85–313746, abstract of JP 60–218 661 and Derwent Abstract of said patent, Nov. 1, 1985.

*Primary Examiner*—D. S. Nakarani
*Attorney, Agent, or Firm*—Sprung Horn Kramer & Woods

[57] ABSTRACT

Mouldings made from polyacetylene-containing polymer products comprising poly-acetylene and a polymer other than polyacetylene are distinguished by improved stability of their optical and electrical properties in air when they have a protective coating of a silicate.

5 Claims, No Drawings

POLYACETYLENE-CONTAINING MOULDINGS

BACKGROUND OF THE INVENTION

The invention relates to polyacetylene-containing polymer products which are distinguished by improved stability to air and in particular oxygen.

Polyacetylene-containing polymer products are disclosed in U.S. Pat. No. 4,769,422. They are suitable, for example, as organic-based electrical conductors and semiconductors. In contrast to pure polyacetylene, they can easily be converted into mouldings, for example films or fibres. They are more stable than pure polyacetylene. However, they are sensitive to oxygen at elevated temperature.

Their preparation is described, for example, in U.S. Pat. No. 4,769,422, in which acetylene is polymerized in organic solution of at least one polymer other than polyacetylene and in the presence of certain nickel(0) complexes. The resultant polyacetylene-containing polymer product can contain from 0.1 to 99% by weight, preferably from 1 to 50% by weight of polyacetylene.

SUMMARY OF THE INVENTION

The present invention refers to mouldings made from a polyacetylene-containing polymer product comprising polyacetylene and a polymer other than polyacetylene which has a protective coating of silicate.

DETAILED DESCRIPTION OF THE INVENTION

The polymer other than polyacetylene can be any soluble polymer, for example polystyrene, polycarbonate, polyvinyl chloride, polychloroprene, polyether, polyacrylonitrile, polyvinylpyrrolidone, polyisoprene, polyvinyl alcohol, cellulose derivatives, for example methylcellulose and copolymers, such as acrylonitrile copolymers, butadiene-acrylonitrile copolymers, which may be hydrogenated, or acrylonitrile(meth)acrylate copolymers. The solvents employed are the solvents which are suitable for said polymers.

Preference is given to polymers containing polar groups, for example halogen atoms, nitrile groups, hydroxyl groups, acetyl groups or carbonate groups, for example polyvinyl chloride, polyvinyl alcohol, polyvinylbutyral, polyacrylonitrile and acrylonitrile-containing copolymers, and polyvinylpyrrolidone, polyvinylcarbazole and methylcellulose.

Preferred solvents are polar aprotic substances, for example dimethylformamide and dimethyl sulphoxide.

On a macroscopic level, the polyacetylene-containing polymer products exhibit either a heterogeneous or a homogeneous distribution of polyacetylene in the polymer matrix. The heterogeneous distribution is evident from discrete black particles of polyacetylene in the polymer matrix, but in highly disperse distribution. The homogeneous distribution is evident from a continuous yellow-brown, red to deep blue colouration of the polymer product.

All polyacetylene-containing polymer products can be converted into mouldings, for example filaments or films, in the conventional manner without loss of their optical and electrical properties. The polyacetylene can also be in oriented form here.

The electrical properties do not change on extended storage.

The polyacetylene can be doped in a conventional manner, for example with iodine. The doping increases the electrical conductivity, if desired, by up to about ten powers of ten, making the products suitable for a broad range of applications from nonconductors via semiconductors to electrical conductors. The formal degree of doping is obtained from the increase in weight caused by iodination.

In accordance with the invention, the mouldings of the polyacetylene-containing polymer products are provided with a silicate coating. This is achieved, in particular, by immersing said mouldings into an aqueous solution of sodium water glass or potassium water glass and subsequently drying the coated mouldings. Even extremely thin coatings result in excellent stabilization of the polyacetylene to oxygen, for example even coatings of about 1 µm. From 50 mg to 2 g of water glass (solid) are preferably required to stabilize 1 $m^2$ of moulding surface. The moulding surface can preferably have been treated in advance with a silane or a borate, this treatment being carried out in such small amounts that the increase in weight is virtually unmeasurable.

This pretreatment is also achieved by briefly immersing the moulding into the solution of a silane or a borate and drying the coated moulding, it also being possible to immerse the moulding into the pure compound in the case of liquid silanes.

Examples of suitable silanes are tetramethoxysilane and tetraethoxysilane. Suitable borates are boric acid and borax.

The stabilizing effect of the silicate coating can be demonstrated in a heat test carried out in air.

To this end, thin transparent coatings of matrix polyacetylenes are produced and their absorption spectra are measured before and after heating.

EXAMPLES

Example 1

(PVPPAC)

5 g of polyvinylpyrrolidone (PVP) were dissolved under an argon protective gas atmosphere in 95 g of dry dimethylformamide (DMF) for 30 minutes at about 60° C. with magnetic stirring in a 250 ml 4-necked flask which had been dried by heating and which was fitted with an internal thermometer, argon and acetylene gas inlet and excess pressure valve. At 60° C., 0.5 mmol of catalyst [NiPh($Ph_2$PCHCPhO)(i-$Pr_3$PCHPh)] dissolved in 3 ml of DMF were then injected and stirred in for 1 minute (Ph=phenyl; i-Pr=isopropyl). Acetylene gas was then passed through the solution in a rapid stream for 30 seconds, the solution becoming a blue-black colour. Unreacted acetylene was expelled by a vigorous stream of argon.

The PVPPAC solution was diluted with DMF in the ratio 1:1. Glass specimen slides were coated by vertical dipping into this solution and drying in air, and the light absorption in the visible wavelength range was measured. Further measurements were carried out after heating at 90° C. in air. The absorbance drops after this heating, and the absorption maximum shifts to shorter wavelength. The colour of the clear coating changes from blue to reddish.

| t (90° C.) | $E^{max}$ | $\lambda^{max}$ |
| --- | --- | --- |
| 0 min | 2.83 | 642 nm |
| 60 min | 2.36 | 588 nm |
| 120 min | 2.09 | 562 nm |

EXAMPLE 2

(PVPPAC, silicate)

The procedure was as in Example 1, but after the coating had been produced, the slide was first dipped in tetraethoxysilane for about 2 minutes, dried and then dipped briefly into aqueous sodium silicate solution and dried. The absorption spectrum was now unchanged after the 2-hour heat treatment.

EXAMPLE 3

(Me-CELPAC)

The procedure was as in Example 1, but 2.5 g of methylcellulose were dissolved in 97.5 g of DMF over the course of 1 hour and 0.25 mmol of catalyst were employed. The blue-black Me-CELPAC solution was used directly for the dip coating, i.e. without further dilution. After heating at 90° C. for 2 hours, the absorbance had dropped from 3.89 to 2.46 and the absorption maximum had shifted from 707 nm to 601 nm.

EXAMPLE 4

(Me-CELPAC, silicate)

A dip-coated glass plate from Example 3 was aftertreated as described in Example 2. The absorption spectrum did not change in the 4-hour 90° C. heat test.

EXAMPLE 5

(PANPAC)

The procedure was as in Example 3, but the matrix polymer used was polyacrylonitrile. The blue-black PANPAC reaction solution was used directly for the dip coating.

After heating at 90° C. for 4 hours, the absorbance of the glass plate coated on both sides with PANPAC had dropped from 1.95 to 1.32; the absorption maximum had shifted from 663 nm to 550 nm and the colour had changed from blue to reddish.

EXAMPLE 6

(PANPAC, silicate)

A dip-coated glass plate from Example 5 was after-treated as described in Example 2. The absorption spectrum did not change in the 4-hour heat test. Accordingly, the colour of the coating remained blue.

EXAMPLE 7

(PANPAC, silicate)

A sample produced as described in Example 6 was kept at 90° C. for 10 days, during which the colour and spectrum remained unchanged.

What is claimed is:

1. A moulding made from a polyacetylene-containing polymer product comprising polyacetylene and a solvent soluble polymer other than polyacetylene which moulding has a protective coating of a sodium silicate or a potassium silicate, said protective coating of silicate being produced by applying aqueous solution of sodium water glass or potassium water glass and drying it.

2. The moulding of claim 1, wherein the polyacetylene makes up from 0.1 to 99% by weight of the total amount of polyacetylene and the polymer other than polyacetylene.

3. The moulding of claim 1, wherein the polyacetylene makes up from 1 to 50% by weight of the total amount of polyacetylene and the polymer other than polyacetylene.

4. The mouldings of claim 1, wherein the protective coating is from 50 mg to 2 g of a sodium silicate or a potassium silicate per $m^2$ of surface of the moulding.

5. The moulding of claim 1, wherein at least one further dried layer is formed between the moulding of polyacetylene-containing polymer product and the silicate protective coating by immersing the moulding into a solution of tetramethoxysilane, tetraethoxysilane, boric acid or borax and drying it before forming said protective coating.

* * * * *